(12) United States Patent
Shi et al.

(10) Patent No.: US 11,218,263 B2
(45) Date of Patent: Jan. 4, 2022

(54) METHOD FOR DETERMINING REFERENCE SIGNAL, NETWORK DEVICE, UE, AND COMPUTER STORAGE MEDIUM

(71) Applicant: GUANGDONG OPPO MOBILE TELECOMMUNICATIONS CORP., LTD., Guangdong (CN)

(72) Inventors: Zhihua Shi, Guangdong (CN); Wenhong Chen, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/696,867

(22) Filed: Nov. 26, 2019

(65) Prior Publication Data

US 2020/0099492 A1    Mar. 26, 2020

Related U.S. Application Data

(63) Continuation of application No. PCT/CN2018/081643, filed on Apr. 2, 2018.

(51) Int. Cl.
*H04L 5/00* (2006.01)
*H04W 72/04* (2009.01)

(52) U.S. Cl.
CPC ......... *H04L 5/0048* (2013.01); *H04W 72/042* (2013.01)

(58) Field of Classification Search
CPC ... H04L 5/0048; H04L 5/0051; H04L 5/0053; H04L 5/0094; H04W 72/042; H04W 24/10; H04W 24/02; H04W 24/08; H04B 17/373
See application file for complete search history.

(56) References Cited

U.S. PATENT DOCUMENTS

2018/0091276 A1    3/2018  Huang et al.
2018/0302889 A1*  10/2018  Guo ................... H04L 5/0085
(Continued)

FOREIGN PATENT DOCUMENTS

CN    107592649 A    1/2018
CN    107659994 A    2/2018
(Continued)

OTHER PUBLICATIONS

3GPP TSG RAN WG1 Meeting AH 1801 R1-1800582 Vancouver, Canada, Jan. 22-26, 2018; "TCI states configuration design to support dynamic BWP switching"; AT&T (Year: 2018).*
(Continued)

*Primary Examiner* — Benjamin H Elliott, IV
(74) *Attorney, Agent, or Firm* — Ladas & Parry LLP

(57) ABSTRACT

The present disclosure discloses a method for determining a reference signal (RS), a network device, a user equipment (UE), and a computer storage medium, where the method includes: configuring N control resource sets for a UE, where K pieces of transmission configuration indication (TCI) information is configured in each of at least part of control resource sets in the N control resource sets, and a quantity of the TCI information K configured in different control resource sets in the at least part of control resource sets is the same or different; where N and K are integers greater than or equal to 1, and at least one RS is indicated in each piece of TCI information; and indicating to the UE the at least one RS in the K pieces of TCI information.

16 Claims, 2 Drawing Sheets

(56) References Cited

U.S. PATENT DOCUMENTS

| | | | | |
|---|---|---|---|---|
| 2018/0343653 A1* | 11/2018 | Guo | ................... | H04W 72/046 |
| 2019/0141693 A1* | 5/2019 | Guo | ................... | H04L 5/0053 |
| 2019/0174466 A1* | 6/2019 | Zhang | ................ | H04W 72/042 |
| 2019/0222284 A1* | 7/2019 | Huang | ................. | H04L 5/0048 |
| 2019/0260445 A1* | 8/2019 | John Wilson | ........ | H04B 7/0626 |
| 2019/0297603 A1* | 9/2019 | Guo | ................... | H04L 5/0053 |
| 2020/0059398 A1* | 2/2020 | Pan | ................... | H04L 41/0654 |
| 2020/0099492 A1* | 3/2020 | Shi | ................... | H04W 72/042 |

FOREIGN PATENT DOCUMENTS

| | | |
|---|---|---|
| RU | 2146419 C1 | 3/2000 |
| TW | 201811092 A | 3/2018 |
| WO | 9512957 A1 | 5/1995 |
| WO | 2008118982 A1 | 10/2008 |
| WO | 2010085190 A1 | 7/2010 |
| WO | 2010091422 A1 | 8/2010 |
| WO | 2013155417 A2 | 10/2013 |
| WO | 2015115991 A1 | 8/2015 |

OTHER PUBLICATIONS

3GPP TSG RAN WG1 Meeting #92 R1-1803407 Athens, Greece, Feb. 26-Mar. 2, 2018; "Updates on QCL parameters in TCI"; ZTE, Sanechips (Year: 2018).*
International Search Report (ISR) dated Jan. 4, 2019 for Application No. PCT/CN2018/081643.
Samsung "Details on configuration of presence of TCI in DCI", 3GPP TSG RAN WG1 Meeting 91; R1-1720308; Reno, USA, Nov. 27-Dec. 1, 2017.
The first OA of the parallel TW application 108111603 dated Jan. 16, 2020.
The EESR of corresponding European application No. 18913534.6. dated Jul. 21, 2020.
Ericcsson: "On beam indication, measurement, and reporting", 3GPP Draft; R1-1716350 on Beam Indication, Measurement, and Reporting, 3rd Generation Partnership Project (3GPP), Mobile Competence Centre; 650, Route Des Lucioles; F-06921 Sophia-Antipolis Cedex; vol. RAN WG1, No. Nagoya, Japan; Sep. 18, 2017-Sep. 21, 2017 Sep. 17, 2017(Sep. 17, 2017), XP051339805.
Samsung: "On Beam Management, Measurement and Reporting", 3GPP Draft; R1-1717605_V6, 3rd Generation Partnership Project (3GPP), Mobile Competence Centre; 650, Route Des Lucioles; F-06921 Sophia-Antipolis Cedex; France, vol. RAN WG1, No. Prague, CZ; Oct. 9, 2017-Oct. 13, 2017 Oct. 8, 2017(Oct. 8, 2017), XP051340791.
Nokia et al: "Further proposals on QCL", 3GPP Draft; R1-1803414-Athens-Further Proposals on QCL, 3rd Generation Partnership Project (3GPP); Mobile Competence Centre; 650, Route Des Lucioles, F-06921 Sophia-Antipolis Cedex; France, vol. RAN WG1, No. Athens, Greece; Feb. 26, 2018-Mar. 2, 2018 Oct. 8, 2018(Oct. 8, 2018, XP051398636.
Samsung: "New MAC CEs for NR MIMO", 3GPP Draft; R2-1802418 New MAC CES for NR MIMO, 3rd Generation Partnership Project (3GPP), Mobile Competence Centre; 650; Route Des Lucioles; F-06921 Sophia-Antipolis Cedex; France, vol. RAN WG2, No. Athens, Greece; Feb. 26, 2018-Mar. 2, 2018 Feb. 14, 2018(Feb. 14, 2018). XP051399173.
Qualcomm; "Beam management for NR", 3GPP Draft; R1-1718541, 3rd Generation Partnership Project (3GPP), Mobile Competence Centre; 650, Route Des Lucioles; F-06921 Sophia-Antipolis Cedex; France, vol. RAN WG1, No. Prague, P.R. Czechia; Oct. 9, 2017-Oct. 13, 2017 Oct. 8, 2017(Oct. 8, 2017), XP051341723.
Intel Corporation, 3GPP TSG-RAN WG1 #89; R1-1707356; Discussion for Mechanism to Recover from Beam Failure Hangzhou, China, May 15-19, 2017.
The second Office Action of corresponding Taiwan application No. 108111608 dated Oct. 19, 2020.
The First Office Action of corresponding Chinese application No. 201911312647.7, dated Nov. 2, 2020.
The first Office Action of corresponding Chilean application No. 201903452, dated Jan. 7, 2021.
The first Office Action of corresponding Canadian application No. 3064313, dated Jan. 8, 2021.
The first Office Action of corresponding Indian application No. 201917047508, dated Feb. 24, 2021.
The first Office Action of corresponding European application No. 18913534.6, dated Mar. 12, 2021.
The second Office Action of corresponding Chilean application No. 201903452, dated Jun. 7, 2021.
The first Office Action of corresponding Russian application No. 2019136636, dated Jul. 21, 2021.
The second Office Action of corresponding European application No. 18973534.6, dated Jul. 26, 2021.

* cited by examiner

101

Configuring N control resource sets for a UE, where K pieces of transmission configuration indication (TCI) information is configured in each of at least part of control resource sets in the N control resource sets, and a quantity of the TCI information K configured in different control resource sets in the at least part of control resource sets is the same or different

102

Indicating to the UE the at least one RS in the K pieces of TCI information

Receiving N control resource sets configured by a network side for the UE, where K pieces of transmission configuration indication (TCI) information is configured in each of at least part of control resource sets in the N control resource sets, and a quantity of the TCI information K configured in different control resource sets in the at least part of control resource sets is the same or different

202

Receiving the at least one RS in the K pieces of TCI information indicated by the network side to the UE

FIG. 2

| Second communicating unit 31 | Second processing unit 32 |

FIG. 3

METHOD FOR DETERMINING REFERENCE SIGNAL, NETWORK DEVICE, UE, AND COMPUTER STORAGE MEDIUM

CROSS-REFERENCE TO RELATED APPLICATIONS

This application is a continuation application of the International application PCT/CN2018/081643, filed on Apr. 2, 2018, entitled "METHOD FOR DETERMINING REFERENCE SIGNAL, NETWORK DEVICE, UE, AND COMPUTER STORAGE MEDIUM", the content of which is hereby incorporated by reference in its entirety.

TECHNICAL FIELD

The present disclosure relates to the field of information processing technologies, and in particular, to a method for determining a reference signal (RS), a network device, a user equipment (UE), and a computer storage medium.

BACKGROUND

Currently, in order to perform beam failure detection, a UE needs to measure a reference signal (for example, a CSI-RS, an SS/PBCH block and etc.) corresponding to a physical downlink control channel (PDCCH). Currently, there are two kinds of methods: Method 1: a network configures a group of RSs for a UE as a measurement signal for the beam failure detection; Method 2: if the network does not configure anything (i.e., does not use Method 1), the UE itself determines, based on a quasi co-location (QCL), a group of RSs as the measurement signal for the beam failure detection.

Regarding Method 2, there are some problems with the current solution. A configuration for a control resource set (CORESET) may include a plurality of transmission configuration indication (TCI) states, if the UE needs to take an RS signal indicated in each of the TCI states as a measurement RS signal for the beam failure detection, two problems may occur: a complexity of the UE is increased, and a beam associated with the QCL indicated by some of the TCI states is not used for the current PDCCH transmission. Therefore, a measurement on a reference signal corresponding to this beam cannot truly reflect a quality of the PDCCH transmission.

SUMMARY

To solve the above technical problem, embodiments of the present disclosure provides a method for determining a reference signal (RS), a network device, a user equipment (UE), and a computer storage medium.

An embodiment of the present disclosure provides a method for determining a reference signal (RS), applied to a network device and including:

configuring N control resource sets for a UE, where K pieces of transmission configuration indication (TCI) information is configured in each of at least part of control resource sets in the N control resource sets, and a quantity of the TCI information K configured in different control resource sets in the at least part of control resource sets is the same or different; where N and K are integers greater than or equal to 1, and at least one RS is indicated in each piece of TCI information; and indicating to the UE the at least one RS in the K pieces of TCI information.

An embodiment of the present disclosure provides a method for determining a reference signal (RS), applied to a UE, including:

receiving N control resource sets configured by a network side for the UE, where K pieces of transmission configuration indication (TCI) information is configured in each of at least part of control resource sets in the N control resource sets, and a quantity of the TCI information K configured in different control resource sets in the at least part of control resource sets is the same or different; where N and K are integers greater than or equal to 1, and at least one RS is indicated in each piece of TCI information; and receiving the at least one RS in the K pieces of TCI information indicated by the network side to the UE.

An embodiment of the present disclosure provides a network device, including:

a first communicating unit, configured to configure N control resource sets for a UE, where K pieces of transmission configuration indication (TCI) information is configured in each of at least part of control resource sets in the N control resource sets, and a quantity of the TCI information K configured in different control resource sets in the at least part of control resource sets is the same or different; where N and K are integers greater than or equal to 1, and at least one RS is indicated in each piece of TCI information; and indicate to the UE the at least one RS in the K pieces of TCI information.

An embodiment of the present disclosure provides a UE, including:

a second communicating unit, configured to receive N control resource sets configured by a network side for the UE, where K pieces of transmission configuration indication (TCI) information is configured in each of at least part of control resource sets in the N control resource sets, and a quantity of the TCI information K configured in different control resource sets in the at least part of control resource sets is the same or different; where N and K are integers greater than or equal to 1, and at least one RS is indicated in each piece of TCI information; and receive the at least one RS in the K pieces of TCI information indicated by the network side to the UE.

An embodiment of the present disclosure provides a network device, including: a processor and a memory for storing a computer program capable of running on the processor;

where the processor is configured to perform steps of the above method when the computer program is run.

An embodiment of the present disclosure provides a UE, including: a processor and a memory for storing a computer program capable of running on the processor;

where the processor is configured to perform steps of the above method when the computer program is run.

An embodiment of the present disclosure provides a computer storage medium storing computer executable instructions which, when being executed, implement steps of the above method.

In technical solutions according to the embodiments of the present disclosure, when it is capable of configuring the control resource set for the UE, only K pieces of TCI are configured in part of the control resource sets, and at least one RS in the K pieces of TCI are indicated to the UE, thus avoiding that the UE measures RSs corresponding to all the TCI in all the control resource sets, thereby reducing a power consumption of the UE and improving an accuracy of beam detection performed by the UE.

BRIEF DESCRIPTION OF DRAWINGS

FIG. 1 is a schematic flowchart 1 of a method for determining an RS according to an embodiment of the present disclosure;

FIG. 2 is a schematic flowchart 2 of a method for determining an RS according to an embodiment of the present disclosure;

FIG. 3 is a schematic structural diagram of a user equipment (UE) according to an embodiment of the present disclosure.

DESCRIPTION OF EMBODIMENTS

Figure 4:
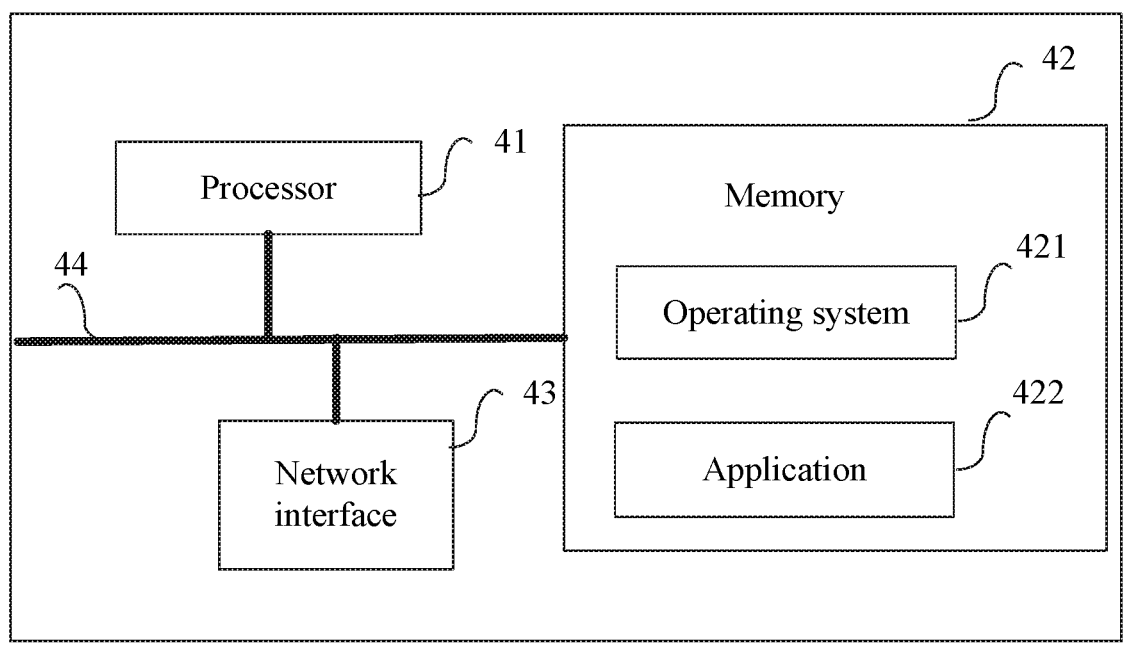
FIG. 4 is a schematic diagram of a hardware architecture according to an embodiment of the present disclosure.

In order to understand the features and technical contents of the embodiments of the present disclosure in more detail, it should first be noted that the RS proposed in the embodiments of the present disclosure may refer to an RS signal, or an RS resource, or an RS resource group. For example, a CSI-RS resource, an index of an SS/PBCH block, or a CSI-RS resource group identifier, and the like, are all within the scope of the concept of the RS in the embodiments of the present disclosure, which are not exhaustively listed herein.

The implementation of the embodiments of the present disclosure is described in detail below with reference to the accompanying drawings. The accompanying drawings are for illustrative purposes only and are not intended to limit the embodiments of the present disclosure.

Embodiment 1

An embodiment of the present disclosure provides a method for determining an RS, which is applied to a network device. As shown in FIG. 1, the method includes:

Step 101: configuring N control resource sets for a UE, where K pieces of transmission configuration indication (TCI) information is configured in each of at least part of control resource sets in the N control resource sets, and a quantity of the TCI information K configured in different control resource sets in the at least part of control resource sets is the same or different; where N and K are integers greater than or equal to 1, and at least one RS is indicated in the TCI information.

Step 102: indicating to the UE the at least one RS in the K pieces of TCI information.

Here, the quantity of the TCI configured in different control resource sets in the at least part of control resource sets is the same or different, that is, K corresponding to the K pieces of TCI configured in different control resource sets (CORESET) in the at least part of the CORESETs can be the same or different.

In an NR system, a network can be configured with one or more CORESETs, each CORESET can contain a time-frequency resource (such as which frequency domain resources are occupied, how many consecutive time domain symbols are occupied), and other configurations, such as a quasi co-location (QCL) for an antenna port, the QCL is provided by a high-level parameter TCI, the parameter is configured for a DM-RS antenna port received by a PDCCH.

In addition, the method may further include: configuring M search spaces for the UE, and the at least part of control resource sets is associated with at least one search space of the M search spaces, and the search spaces are used for the UE to detect at least one RS in the K pieces of TCI information in a control resource set corresponding to a PDCCH.

That is, after aiming at the at least part of control resource sets (CORESET), it is necessary to indicate a search space associated with the at least part of CORESETs to the UE, after which the UE will detect the corresponding PDCCH.

Based on the above description, various processing scenarios are separately performed below:

Scene 1

When one CORESET is configured with multiple TCI states, an RS corresponding to the activated TCI state is used as a measurement RS for beam failure detection.

The network configures N CORESETs for the UE, where K TCI states are configured on CORESET X. The network configures M search spaces for the UE to monitor the PDCCH, where CORESET X is associated with one or more of the search spaces.

In this scenario, when indicating the RS to be used, the following method is adopted, where the indicating to the UE the at least one RS in the K pieces of TCI information includes one of the following:

in the K pieces of TCI information, an RS indicated by TCI information activated through MAC CE signaling;

in the K pieces of TCI information, an RS indicated by TCI information indicated through DCI.

Specifically, for the beam failure detection, when the UE needs to determine a link quality of the PDCCH corresponding to CORESET X, it is required to determine from the K TCI states that an RS indicated in a certain TCI state is used, and the determining method has the following options:

in the K TCI states, the one activated under the indication of the MAC CE signaling.

in the K TCI states, the one activated under the indication of the DCI.

Scene 2

When one TCI state indicates one piece of QCL information, an RS associated with a spatially correlated QCL is used as the measurement RS for the beam failure detection.

The method further includes: indicating QCL information in a piece of TCI; where the QCL information corresponds to at least two pieces of RS information; where RSs indicated by the at least two pieces of RS information are the same or different, and different RS information corresponds to different QCL parameter types.

That is, the network configures N CORESETs for the UE, where one TCI state is configured on CORESET X, and the TCL state indicates one piece of QCL information, and this QCL information corresponds to two RSs, and each of the RSs corresponds to a different QCL parameter type. It should be understood that two pieces of RS information included in the QCL information may indicate the same RS, but each RS may correspond, respectively, to a different QCL parameter type.

For one TCI state indicating one piece of QCL information, one or two RSs may be configured, and each RS corresponds to a different QCL parameter type, for example, two RSs form a group of QCL information, RS1 corresponds to QCL-TypeA, and RS2 corresponds to QCL-TypeD.

QCL types can include:

QCL-type TypeA: {a Doppler shift, Doppler spread, an average delay, a delay spread};

QCL-type TypeB: {a Doppler shift, Doppler spread};

QCL-TypeC: {an average delay, a Doppler shift};

QCL-TypeD: {a spatial Rx parameter}.

The network configures M search spaces for the UE to monitor the PDCCH, where CORESET X is associated with one or more of the search spaces.

For the beam failure detection, when the UE needs to determine the link quality of the PDCCH corresponding to CORESET X, it is required to determine to use a certain RS from the two RSs indicated by the TCI state, where the instructing the UE to use one RS in the target TCI includes one of the following:

in at least two RSs included in the target TCI, using an RS corresponding to a spatial QCL parameter; that is, in the two RSs, using the RS corresponding to the spatial QCL information;

in the at least two RSs included in the target TCI, using an RS that does not correspond to the spatial QCL parameter; that is, in the two RSs, using the RS that does not correspond to the spatial QCL information;

in the at least two RSs included in the target TCI, causing the UE to select an RS;

in the at least two RSs included in the target TCI, determining an RS to be used according to serial numbers of the RSs; for example, in the two RSs, determining which one to use according to the serial numbers of the RSs, and exemplarily, the RS with a small or a large serial number can be selected, which can be set according to actual situations;

in the at least two RSs included in the target TCI, determining an RS to be used according to locations of the RSs in configuration signaling; for example, in the two RSs, determining which one to use according to the locations of the RSs in the configuration signaling, and exemplarily, the RS whose location is in the front or in the back can be determined.

Based on the foregoing solution, after the UE obtains the RS to be used, the RS is configured for measurement on the RS to determine whether a link quality corresponding to a PDCCH corresponding to the RS satisfies a predetermined threshold.

Specifically, the RS may be used in a beam failure recovery procedure or a link reconfiguration procedure. For example, through measuring the CSI-RS and/or the SS/PBCH block, the UE determines whether the link quality corresponding to the corresponding PDCCH satisfies a predetermined/configured threshold (a hypothetical BLER performance is worse than the threshold); the UE selects a new beam (whose L1-reference signal received power (L1-RSRP) performance is better than the threshold) that satisfies the predetermined/configured threshold through the CSI-RS and/or the SS/PBCH block; the UE selects a physical random access channel (PRACH) corresponding to the new beam to initiate transmission, or reports the new selected beam through a physical uplink control channel (PUCCH); the UE detects a response of the network.

It should be further explained that the beam mentioned in the above is actually represented by information of a signal carried by the beam. In actual use, it is represented by an index of the CSI-RS resource or the synchronization signal (SS) block/PBCH block.

It can be seen that, by adopting the foregoing solution, when it is capable of configuring the control resource set for the UE, only K pieces of TCI are configured in part of the control resource sets, and at least one RS in the K pieces of TCI are indicated to the UE, thus avoiding that the UE measures RSs corresponding to all the TCI in all the control resource sets, thereby reducing a power consumption of the UE and improving an accuracy of beam detection performed by the UE.

Embodiment 2

An embodiment of the present disclosure provides a method for determining an RS, which is applied to a UE. As shown in FIG. 2, the method includes:

Step 201: receiving N control resource sets configured by a network side for a UE, where K pieces of transmission configuration indication (TCI) information is configured in at least part of control resource sets in the N control resource sets, and a quantity of the TCI configured in different control resource sets in the at least part of control resource sets is the same or different; where N and K are integers greater than or equal to 1, and at least one RS is indicated in the TCI information.

Step 202: receiving the at least one RS in the K pieces of TCI information indicated by the network side to the UE.

Here, the quantity of the TCI configured in different control resource sets in the at least part of control resource sets is the same or different, that is, K corresponding to the K pieces of TCI configured in different control resource sets (CORESET) in the at least part of the CORESETs can be the same or different.

In an NR system, a network can be configured with one or more CORESETs, each CORESET can contain a time-frequency resource (such as which frequency domain resources are occupied, how many consecutive time domain symbols are occupied), and other configurations, such as a quasi co-location (QCL) for an antenna port, the QCL is provided by a high-level parameter TCI, the parameter is configured for a DM-RS antenna port received by a PDCCH.

In addition, the method may further include: receiving M search spaces configured by the network side for the UE, and the at least part of control resource sets is associated with at least one search space of the M search spaces; and detecting at least one RS in the K pieces of TCI information in a control resource set corresponding to a PDCCH according to the configured M search spaces.

That is, after aiming at the at least part of control resource sets (CORESET), it is necessary to indicate a search space associated with the at least part of CORESETs to the UE, after which the UE will detect the corresponding PDCCH.

Based on the above description, various processing scenarios are separately performed below:

Scene 1

When one CORESET is configured with multiple TCI states, an RS corresponding to the activated TCI state is used as a measurement RS for beam failure detection.

The network configures N CORESETs for the UE, where K TCI states are configured on CORESET X. The network configures M search spaces for the UE to monitor the PDCCH, where CORESET X is associated with one or more of the search spaces.

In this scenario, when indicating the RS to be used, the following method is adopted, where the indicating to the UE the at least one RS in the K pieces of TCI information includes one of the following:

receiving an RS indicated by one piece of TCI information of the K pieces of TCI information activated through MAC CE signaling by the network side;

receiving an RS indicated by one piece of TCI information of the K pieces of TCI information activated through DCI by the network side.

Specifically, for the beam failure detection, when the UE needs to determine a link quality of the PDCCH corresponding to CORESET X, it is required to determine from the K TCI states that an RS indicated in a certain TCI state is used, and the determining method has the following options:

in the K TCI states, the one activated under the indication of the MAC CE signaling.

in the K TCI states, the one activated under the indication of the DCI.

Scene 2

When one TCI state indicates one piece of QCL information, an RS associated with a spatially correlated QCL is used as the measurement RS for the beam failure detection.

The method further includes: receiving QCL information indicated by the network side in the TCI; where the QCL information corresponds to at least two pieces of RS information;

where RSs indicated by the at least two pieces of RS information are the same or different, and different RS information corresponds to different QCL parameter types.

That is, the network configures N CORESETs for the UE, where one TCI state is configured on CORESET X, and the TCL state indicates one piece of QCL information, and this QCL information corresponds to two RSs, and each of the RSs corresponds to a different QCL parameter type. It should be understood that two pieces of RS information included in the QCL information may indicate the same RS, but each RS may correspond, respectively, to a different QCL parameter type.

For one TCI state indicating one piece of QCL information, one or two RSs may be configured, and each RS corresponds to a different QCL parameter type, for example, two RSs form a group of QCL information, RS1 corresponds to QCL-TypeA, and RS2 corresponds to QCL-TypeD.

QCL types can include:

QCL-type TypeA: {a Doppler shift, Doppler spread, an average delay, a delay spread};

QCL-type TypeB: {a Doppler shift, Doppler spread};

QCL-TypeC: {an average delay, a Doppler shift};

QCL-TypeD: {a spatial Rx parameter}.

The network configures M search spaces for the UE to monitor the PDCCH, where CORESET X is associated with one or more of the search spaces.

For the beam failure detection, when the UE needs to determine the link quality of the PDCCH corresponding to CORESET X, it is required to determine to use a certain RS from the two RSs indicated by the TCI state, where the instructing the UE to use one RS in the target TCI includes one of the following:

in at least two RSs included in the target TCI, using an RS corresponding to a spatial QCL parameter; that is, in the two RSs, using the RS corresponding to the spatial QCL information;

in the at least two RSs included in the target TCI, using an RS that does not correspond to the spatial QCL parameter; that is, in the two RSs, using the RS that does not correspond to the spatial QCL information;

in the at least two RSs included in the target TCI, causing the UE to select an RS;

in the at least two RSs included in the target TCI, determining an RS to be used according to serial numbers of the RSs; for example, in the two RSs, determining which one to use according to the serial numbers of the RSs, and exemplarily, the RS with a small or a large serial number can be selected, which can be set according to actual situations;

in the at least two RSs included in the target TCI, determining an RS to be used according to locations of the RSs in configuration signaling; for example, in the two RSs, determining which one to use according to the locations of the RSs in the configuration signaling, and exemplarily, the RS whose location is in the front or in the back can be determined.

Based on the foregoing solution, after the UE obtains the RS to be used, the RS is configured for measurement on the RS to determine whether a link quality corresponding to a PDCCH corresponding to the RS satisfies a predetermined threshold.

Specifically, the RS may be used in a beam failure recovery procedure or a link reconfiguration procedure. For example, through measuring the CSI-RS and/or the SS/PBCH block, the UE determines whether the link quality corresponding to the corresponding PDCCH satisfies a predetermined/configured threshold (a hypothetical BLER performance is worse than the threshold); the UE selects a new beam (whose L1-RSRP performance is better than the threshold) that satisfies the predetermined/configured threshold through the CSI-RS and/or the SS/PBCH block; the UE selects a PRACH corresponding to the new beam to initiate transmission, or reports the new selected beam through a PUCCH; the UE detects a response of the network.

It should be further explained that the beam mentioned in the above is actually represented by information of a signal carried by the beam. In actual use, it is represented by an index of the CSI-RS resource or the synchronization signal (SS) block/PBCH block.

It can be seen that, by adopting the foregoing solution, when it is capable of configuring the control resource set for the UE, only K pieces of TCI are configured in part of the control resource sets, and at least one RS in the K pieces of TCI are indicated to the UE, thus avoiding that the UE measures RSs corresponding to all the TCI in all the control resource sets, thereby reducing a power consumption of the UE and improving an accuracy of beam detection performed by the UE.

Embodiment 3

An embodiment of the disclosure provides a network device, including:

a first communicating unit, configured to configure N control resource sets for a UE, where K pieces of transmission configuration indication (TCI) information is configured in at least part of control resource sets in the N control resource sets, and a quantity of the TCI configured in different control resource sets in the at least part of control resource sets is the same or different; where N and K are integers greater than or equal to 1, and at least one RS is indicated in the TCI information; and indicate to the UE the at least one RS in the K pieces of TCI information.

Here, the quantity of the TCI configured in different control resource sets in the at least part of control resource sets is the same or different, that is, K corresponding to the K pieces of TCI configured in different Control Resource Sets (CORESET) in the at least part of the CORESETs can be the same or different.

In an NR system, a network can be configured with one or more CORESETs, each CORESET can contain a time-frequency resource (such as which frequency domain resources are occupied, how many consecutive time domain symbols are occupied), and other configurations, such as a quasi co-location (QCL) for an antenna port, the QCL is provided by a high-level parameter TCI, the parameter is configured for a DM-RS antenna port received by a PDCCH.

In addition, the first communicating unit configures M search spaces for the UE, and the at least part of control resource sets is associated with at least one search space of the M search spaces, and the search spaces are used for the UE to detect at least one RS in the K pieces of TCI information in a control resource set corresponding to PDCCH.

That is, after aiming at the at least part of control resource sets (CORESET), it is necessary to indicate a search space associated with the at least part of CORESETs to the UE, after which the UE will detect the corresponding PDCCH.

Based on the above description, various processing scenarios are separately performed below:

Scene 1

When one CORESET is configured with multiple TCI states, an RS corresponding to the activated TCI state is used as a measurement RS for beam failure detection.

The network configures N CORESETs for the UE, where K TCI states are configured on CORESET X. The network configures M search spaces for the UE to monitor the PDCCH, where CORESET X is associated with one or more of the search spaces.

In this scenario, when indicating the RS to be used, the first communicating unit includes one of the following:

in the K pieces of TCI information, an RS indicated by TCI information activated through MAC CE signaling;

in the K pieces of TCI information, an RS indicated by TCI information indicated through DCI.

Specifically, for the beam failure detection, when the UE needs to determine a link quality of the PDCCH corresponding to CORESET X, it is required to determine from the K TCI states that an RS indicated in a certain TCI state is used, and the determining method has the following options:

in the K TCI states, the one activated under the indication of the MAC CE signaling.

in the K TCI states, the one activated under the indication of the DCI.

Scene 2

When one TCI state indicates one piece of QCL information, an RS associated with a spatially correlated QCL is used as the measurement RS for the beam failure detection.

The first communicating unit indicates QCL information in a piece of TCI; where the QCL information corresponds to at least two pieces of RS information; where RSs indicated by the at least two pieces of RS information are the same or different, and different RS information corresponds to different QCL parameter types.

That is, the network configures N CORESETs for the UE, where one TCI state is configured on CORESET X, and the TCL state indicates one piece of QCL information, and this QCL information corresponds to two RSs, and each of the RSs corresponds to a different QCL parameter type. It should be understood that two pieces of RS information included in the QCL information may indicate the same RS, but each RS may correspond, respectively, to a different QCL parameter type.

For one TCI state indicating one piece of QCL information, one or two RSs may be configured, and each RS corresponds to a different QCL parameter type, for example, two RSs form a group of QCL information, RS1 corresponds to QCL-TypeA, and RS2 corresponds to QCL-TypeD.

QCL types can include:

QCL-type TypeA: {a Doppler shift, Doppler spread, an average delay, a delay spread};

QCL-type TypeB: {a Doppler shift, Doppler spread};

QCL-TypeC: {an average delay, a Doppler shift};

QCL-TypeD: {a spatial Rx parameter}.

The network configures M search spaces for the UE to monitor the PDCCH, where CORESET X is associated with one or more of the search spaces.

For the beam failure detection, when the UE needs to determine the link quality of the PDCCH corresponding to CORESET X, it is required to determine to use a certain RS from the two RSs indicated by the TCI state, where the UE is instructed to use one RS in the target TCI, the first communicating unit includes one of the following:

in at least two RSs included in the target TCI, using an RS corresponding to a spatial QCL parameter; that is, in the two RSs, using the RS corresponding to the spatial QCL information;

in the at least two RSs included in the target TCI, using an RS that does not correspond to the spatial QCL parameter; that is, in the two RSs, using the RS that does not correspond to the spatial QCL information;

in the at least two RSs included in the target TCI, causing the UE to select an RS;

in the at least two RSs included in the target TCI, determining an RS to be used according to serial numbers of the RSs; for example, in the two RSs, determining which one to use according to the serial numbers of the RSs, and exemplarily, the RS with a small or a large serial number can be selected, which can be set according to actual situations;

in the at least two RSs included in the target TCI, determining an RS to be used according to locations of the RSs in configuration signaling; for example, in the two RSs, determining which one to use according to the locations of the RSs in the configuration signaling, and exemplarily, the RS whose location is in the front or in the back can be determined.

Based on the foregoing solution, after the UE obtains the RS to be used, the RS is configured for measurement on the RS to determine whether a link quality corresponding to a PDCCH corresponding to the RS satisfies a predetermined threshold.

Specifically, the RS may be used in a beam failure recovery procedure or a link reconfiguration procedure. For example, through measuring the CSI-RS and/or the SS/PBCH block, the UE determines whether the link quality corresponding to the corresponding PDCCH satisfies a predetermined/configured threshold (a hypothetical BLER performance is worse than the threshold); the UE selects a new beam (whose L1-RSRP performance is better than the threshold) that satisfies the predetermined/configured threshold through the CSI-RS and/or the SS/PBCH block; the UE selects a PRACH corresponding to the new beam to initiate transmission, or reports the new selected beam through a PUCCH; the UE detects a response of the network.

It should be further explained that the beam mentioned in the above is actually represented by information of a signal carried by the beam. In actual use, it is represented by an index of the CSI-RS resource or the synchronization signal (SS) block/PBCH block.

It can be seen that, by adopting the foregoing solution, when it is capable of configuring the control resource set for the UE, only K pieces of TCI are configured in part of the control resource sets, and at least one RS in the K pieces of TCI are indicated to the UE, thus avoiding that the UE measures RSs corresponding to all the TCI in all the control resource sets, thereby reducing a power consumption of the UE and improving an accuracy of beam detection performed by the UE.

Embodiment 4

An embodiment of the present disclosure provides a UE, as shown in FIG. 3, including:

a second communicating unit 31 for receiving N control resource sets configured by a network side for a UE, where K pieces of transmission configuration indication (TCI) information is configured in at least part of control resource sets in the N control resource sets, and a quantity of the TCI configured in different control resource sets in the at least part of control resource sets is the same or different; where N and K are integers greater than or equal to 1, and at least one RS is indicated in the TCI information; and receiving the at least one RS in the K pieces of TCI information indicated by the network side to the UE.

Here, the quantity of the TCI configured in different control resource sets in the at least part of control resource sets is the same or different, that is, K corresponding to the K pieces of TCI configured in different Control Resource Sets (CORESET) in the at least part of the CORESETs can be the same or different.

In an NR system, a network can be configured with one or more CORESETs, each CORESET can contain a time-frequency resource (such as which frequency domain resources are occupied, how many consecutive time domain symbols are occupied), and other configurations, such as a quasi co-location (QCL) for an antenna port, the QCL is provided by a high-level parameter TCI, the parameter is configured for a DM-RS antenna port received by a PDCCH.

In addition, the UE further includes:

a second communicating unit 31 is configured to receive M search spaces configured by the network side for the UE, and the at least part of control resource sets is associated with at least one search space of the M search spaces; and the second processing unit 32 is configured to detect at least one RS in the K pieces of TCI information in a control resource set corresponding to a PDCCH according to the configured M search spaces.

That is, after aiming at the at least part of control resource sets (CORESET), it is necessary to indicate a search space associated with the at least part of CORESETs to the UE, after which the UE will detect the corresponding PDCCH.

Based on the above description, various processing scenarios are separately performed below:

Scene 1

When one CORESET is configured with multiple TCI states, an RS corresponding to the activated TCI state is used as a measurement RS for beam failure detection.

The network configures N CORESETs for the UE, where K TCI states are configured on CORESET X. The network configures M search spaces for the UE to monitor the PDCCH, where CORESET X is associated with one or more of the search spaces.

In this scenario, when indicating the RS to be used, the second communicating unit 31 includes one of the following:

receiving an RS indicated by one piece of TCI information of the K pieces of TCI information activated through MAC CE signaling by the network side;

receiving an RS indicated by one piece of TCI information of the K pieces of TCI information activated through DCI by the network side.

Specifically, for the beam failure detection, when the UE needs to determine a link quality of the PDCCH corresponding to CORESET X, it is required to determine from the K TCI states that an RS indicated in a certain TCI state is used, and the determining method has the following options:

in the K TCI states, the one activated under the indication of the MAC CE signaling.

in the K TCI states, the one activated under the indication of the DCI.

Scene 2

When one TCI state indicates one piece of QCL information, an RS associated with a spatially correlated QCL is used as the measurement RS for the beam failure detection.

The second communicating unit 31 receives QCL information indicated by the network side in the TCI; where the QCL information corresponds to at least two pieces of RS information;

where RSs indicated by the at least two pieces of RS information are the same or different, and different RS information corresponds to different QCL parameter types.

That is, the network configures N CORESETs for the UE, where one TCI state is configured on CORESET X, and the TCL state indicates one piece of QCL information, and this QCL information corresponds to two RSs, and each of the RSs corresponds to a different QCL parameter type. It should be understood that two pieces of RS information included in the QCL information may indicate the same RS, but each RS may correspond, respectively, to a different QCL parameter type.

For one TCI state indicating one piece of QCL information, one or two RSs may be configured, and each RS corresponds to a different QCL parameter type, for example, two RSs form a group of QCL information, RS1 corresponds to QCL-TypeA, and RS2 corresponds to QCL-TypeD.

QCL types can include:

QCL-type TypeA: {a Doppler shift, Doppler spread, an average delay, a delay spread};

QCL-type TypeB: {a Doppler shift, Doppler spread};

QCL-TypeC: {an average delay, a Doppler shift};

QCL-TypeD: {a spatial Rx parameter}.

The network configures M search spaces for the UE to monitor the PDCCH, where CORESET X is associated with one or more of the search spaces.

For the beam failure detection, when the UE needs to determine the link quality of the PDCCH corresponding to CORESET X, it is required to determine to use a certain RS from the two RSs indicated by the TCI state, where the UE is instructed to use one RS in the target TCI, the second processing unit 32 includes one of the following:

in at least two RSs included in the target TCI, using an RS corresponding to a spatial QCL parameter; that is, in the two RSs, using the RS corresponding to the spatial QCL information;

in the at least two RSs included in the target TCI, using an RS that does not correspond to the spatial QCL parameter; that is, in the two RSs, using the RS that does not correspond to the spatial QCL information;

in the at least two RSs included in the target TCI, causing the UE to select an RS;

in the at least two RSs included in the target TCI, determining an RS to be used according to serial numbers of the RSs; for example, in the two RSs, determining which one to use according to the serial numbers of the RSs, and exemplarily, the RS with a small or a large serial number can be selected, which can be set according to actual situations;

in the at least two RSs included in the target TCI, determining an RS to be used according to locations of the RSs in configuration signaling; for example, in the two RSs, determining which one to use according to the locations of the RSs in the configuration signaling, and exemplarily, the RS whose location is in the front or in the back can be determined.

Based on the foregoing solution, after the UE obtains the RS to be used, the RS is configured for measurement on the RS to determine whether a link quality corresponding to a PDCCH corresponding to the RS satisfies a predetermined threshold.

Specifically, the RS may be used in a beam failure recovery procedure or a link reconfiguration procedure. For example, through measuring the CSI-RS and/or the SS/PBCH block, the UE determines whether the link quality corresponding to the corresponding PDCCH satisfies a predetermined/configured threshold (a hypothetical BLER performance is worse than the threshold); the UE selects a new beam (whose L1-RSRP performance is better than the threshold) that satisfies the predetermined/configured threshold through the CSI-RS and/or the SS/PBCH block; the UE selects a PRACH corresponding to the new beam to initiate transmission, or reports the new selected beam through a PUCCH; the UE detects a response of the network.

It should be further explained that the beam mentioned in the above is actually represented by information of a signal carried by the beam. In actual use, it is represented by an index of the CSI-RS resource or the synchronization signal (SS) block/PBCH block index.

It can be seen that, by adopting the foregoing solution, when it is capable of configuring the control resource set for the UE, only K pieces of TCI are configured in part of the control resource sets, and at least one RS in the K pieces of TCI are indicated to the UE, thus avoiding that the UE measures RSs corresponding to all the TCI in all the control resource sets, thereby reducing a power consumption of the UE and improving an accuracy of beam detection performed by the UE.

An embodiment of the present disclosure further provides a hardware architectural structure of a user equipment (UE) or a network device, which, as shown in FIG. 4, includes at least one processor 41, a memory 42, and at least one network interface 43. The various components are coupled together through a bus system 44. It will be understood that the bus system 44 is configured to implement connection and communication between these components. The bus system 44 includes, in addition to a data bus, a power bus, a control bus, and a status signal bus. However, for clarity of description, various buses are labeled as the bus system 44 in FIG. 4.

It is understood that the memory 42 in the embodiment of the present disclosure may be a volatile memory or a non-volatile memory, or may include both volatile and non-volatile memories.

In some embodiments, the memory 42 stores the following elements, executable modules or data structures, or a subset thereof, or their extension set:

an operating system 421 and an application 422.

The processor 41 is configured to be capable of processing the method steps in Embodiment 1 or Embodiment 2, and details are not described herein.

The above apparatus according to the embodiments of the present disclosure may be stored in a computer readable storage medium if being implemented in the form of a software functional module and sold or used as a standalone product. Based on such understanding, the essence of the technical solutions of the embodiments of the present disclosure, or a part of the technical solutions of the present disclosure contributing to the prior art, may be embodied in the form of a software product which is stored in a storage medium, including instructions for enabling a computer device (which may be a personal computer, a server, or a network device, etc.) to perform all or part of the methods described in the embodiments of the present disclosure. The above storage medium includes: various mediums capable of storing program codes, such as a universal serial bus (USB) flash disk, a mobile hard disk, a read-only memory (ROM), a magnetic disk, an optical disk, or the like. Thus, the embodiments of the present disclosure are not limited to any specific combination of hardware and software.

An embodiment of the present disclosure provides a computer storage medium storing computer executable instructions which, when being executed, perform the steps of the method of Embodiment 1 or Embodiment 2.

While preferred embodiments of the present disclosure have been disclosed for purposes of illustration, those skilled in the art will recognize that various modifications, additions and substitutions are possible, and thus the scope of the present disclosure should not be limited to the embodiments described above.

What is claimed is:

1. A method for determining a reference signal (RS), applied to a network device and comprising:
configuring N control resource sets for a user equipment (UE), wherein K pieces of transmission configuration indication (TCI) information is configured in each of at least part of control resource sets in the N control resource sets, and a quantity of the TCI information K configured in different control resource sets in the at least part of control resource sets is the same or different; wherein N and K are integers greater than or equal to 1, and at least one RS is indicated in each piece of TCI information; and
indicating to the UE the at least one RS in the K pieces of TCI information;
wherein said indicating to the UE the at least one RS in the number K of TCI information comprises:
indicating one piece of target TCI information in the number K of TCI information to the UE, and in two RSs comprised in the target TCI information, instructing the UE to use an RS corresponding to a spatial QCL parameter and configured for measurement on the RS to determine whether a link quality corresponding to a physical downlink control channel (PDCCH) corresponding to the RS satisfies a predetermined threshold.

2. The method according to claim 1, wherein the method further comprises:
configuring M search spaces for the UE, wherein each of the at least part of control resource sets is associated with at least one search space of the M search spaces, and the search spaces are used for the UE to detect a physical downlink control channel (PDCCH).

3. The method according to claim 1, wherein the at least one RS in the K pieces of TCI information indicated to the UE comprises one of the following:
in the K pieces of TCI information, an RS indicated by TCI information activated through medium access control (MAC) control element (CE) signaling;
in the K pieces of TCI information, an RS indicated by TCI information indicated through downlink control information (DCI).

4. The method according to claim 1, wherein the method further comprises:
indicating quasi co-location (QCL) information in each piece of TCI information; wherein the QCL information corresponds to at least two pieces of RS information;
wherein RSs indicated by the at least two pieces of RS information are the same or different, and different RS information corresponds to different QCL parameter types.

5. A method for determining a reference signal (RS), applied to a user equipment (UE) and comprising:

receiving N control resource sets configured by a network side for the UE, wherein K pieces of transmission configuration indication (TCI) information is configured in each of at least part of control resource sets in the N control resource sets, and a quantity of the TCI information K configured in different control resource sets in the at least part of control resource sets is the same or different; wherein N and K are integers greater than or equal to 1, and at least one RS is indicated in each piece of TCI information; and receiving the at least one RS in the K pieces of TCI information indicated by the network side to the UE;

wherein said receiving the at least one RS in the number, K of TCI information indicated by the network side to the UE comprises:

receiving one piece of target TCI information in the number K of TCI information indicated by the network side to the UE, and in two RSs comprised in the target TCI information, receiving an RS corresponding to a spatial QCL parameter and configured for measurement on the RS to determine whether a link quality corresponding to a physical downlink control channel (PDCCH) corresponding to the RS satisfies a predetermined threshold.

6. The method according to claim 5, wherein the method further comprises:

receiving M search spaces configured by the network side for the UE, and each of the at least part of control resource sets is associated with at least one search space of the M search spaces; and detecting a physical downlink control channel (PDCCH) based on the configured M search spaces.

7. The method according to claim 5, wherein the receiving the at least one RS in the K pieces of TCI information indicated by the network side to the UE comprises one of the following:

receiving an RS indicated by one piece of TCI information of the K pieces of TCI information activated through medium access control (MAC) control element (CE) signaling by the network side;

receiving an RS indicated by one piece of TCI information of the K pieces of TCI information activated through downlink control information (DCI) by the network side.

8. The method according to claim 5, wherein the method further comprises:

receiving quasi co-location (QCL) information indicated by the network side in each piece of TCI information; wherein the QCL information corresponds to at least two pieces of RS information;

wherein RSs indicated by the at least two pieces of RS information are the same or different, and different RS information corresponds to different QCL parameter types.

9. A network device, comprising a processor and a memory for storing a computer program capable of running on the processor, wherein when the computer program is run, the processor is configured to:

configure N control resource sets for a user equipment (UE), wherein K pieces of transmission configuration indication (TCI) information is configured in each of at least part of control resource sets in the N control resource sets, and a quantity of the TCI information K configured in different control resource sets in the at least part of control resource sets is the same or different; wherein N and K are integers greater than or equal to 1, and at least one RS is indicated in each piece of TCI information; and control a network interface to indicate to the UE the at least one RS in the K pieces of TCI information;

wherein the processor is further configured to indicate one piece of target TCI information in the number K of TCI information to the UE, and in two RSs comprised in the target TCI information, instruct the UE to use an RS corresponding to a spatial QCL parameter and configured for measurement on the RS to determine whether a link quality corresponding to a physical downlink control channel (PDCCH) corresponding to the RS satisfies a predetermined threshold.

10. The network device according to claim 9, wherein the processor is further configured to configure M search spaces for the UE, wherein each of the at least part of control resource sets is associated with at least one search space of the M search spaces, and the search spaces are used for the UE to detect a physical downlink control channel (PDCCH).

11. The network device according to claim 9, wherein the at least one RS in the K pieces of TCI information indicated to the UE comprises one of the following:

in the K pieces of TCI information, an RS indicated by TCI information activated through medium access control (MAC) control element (CE) signaling;

in the K pieces of TCI information, an RS indicated by TCI information indicated through downlink control information (DCI).

12. The network device according to claim 9, wherein the processor is configured to indicate quasi co-location (QCL) information in each piece of TCI information; wherein the QCL information corresponds to at least two pieces of RS information;

wherein RSs indicated by the at least two pieces of RS information are the same or different, and different RS information corresponds to different QCL parameter types.

13. A user equipment (UE), comprising a processor and a memory for storing a computer program capable of running on the processor, wherein when the computer program is run, the processor is configured to:

control a network interface to receive N control resource sets configured by a network side for the UE, wherein K pieces of transmission configuration indication (TCI) information is configured in each of at least part of control resource sets in the N control resource sets, and a quantity of the TCI information K configured in different control resource sets in the at least part of control resource sets is the same or different; wherein N and K are integers greater than or equal to 1, and at least one RS is indicated in each piece of TCI information; and control the network interface to receive the at least one RS in the K pieces of TCI information indicated by the network side to the UE;

wherein the processor is further configured to control the network interface to receive one piece of target TCI information in the number K of TCI information indicated by the network side, and in two RSs comprised in the target TCI information, receive an RS corresponding to a spatial QCL parameter and configured for measurement on the RS to determine whether a link quality corresponding to a physical downlink control channel (PDCCH) corresponding to the RS satisfies a predetermined threshold.

14. The UE according to claim 13, wherein the processor is further configured to:
control the network interface to receive M search spaces configured by the network side for the UE, and each of the at least part of control resource sets is associated with at least one search space of the M search spaces; and
detect a physical downlink control channel (PDCCH) based on the configured M search spaces.

15. The UE according to claim 13, wherein the processor is further configured to perform one of the following:
controlling the network interface to receive an RS indicated by one piece of TCI information of the K pieces of TCI information activated through medium access control (MAC) control element (CE) signaling by the network side;
controlling the network interface to receive an RS indicated by one piece of TCI information of the K pieces of TCI information activated through downlink control information (DCI) by the network side.

16. The UE according to claim 13, wherein the processor is further configured to control the network interface to receive quasi co-location (QCL) information indicated by the network side in each piece of TCI information; wherein the QCL information corresponds to at least two pieces of RS information;
wherein RSs indicated by the at least two pieces of RS information are the same or different, and different RS information corresponds to different QCL parameter types.

* * * * *